United States Patent
Frey et al.

(10) Patent No.: US 12,544,199 B2
(45) Date of Patent: Feb. 10, 2026

(54) MANUFACTURING METHOD FOR A DENTAL OBJECT

(71) Applicant: Ivoclar Vivadent AG, Schaan (LI)

(72) Inventors: Alen Frey, Feldkirch (AT); Hendrik John, Buchs (CH); Andreas Schülke, Grabs (CH); Katja Hönow, Gamprin (LI)

(73) Assignee: Ivoclar Vivadent AG, Schaan (LI)

( * ) Notice: Subject to any disclaimer, the term of this patent is extended or adjusted under 35 U.S.C. 154(b) by 379 days.

(21) Appl. No.: 18/193,553

(22) Filed: Mar. 30, 2023

(65) Prior Publication Data

US 2023/0310128 A1    Oct. 5, 2023

(30) Foreign Application Priority Data

Mar. 31, 2022 (EP) ..................................... 22165823

(51) Int. Cl.
   *A61C 13/00*     (2006.01)
   *B33Y 30/00*     (2015.01)
   *G16H 50/50*     (2018.01)

(52) U.S. Cl.
   CPC ................ *A61C 13/0004* (2013.01)

(58) Field of Classification Search
   CPC ....... A61C 13/0004; A61C 5/77; A61C 13/08; B33Y 30/00; B33Y 50/00; B33Y 50/02; B33Y 80/00; B33Y 10/00; G16H 50/50
   USPC .......................................................... 700/96
   See application file for complete search history.

(56) References Cited

U.S. PATENT DOCUMENTS

| | | | |
|---|---|---|---|
| 8,209,044 B2 | 6/2012 | Noue | |
| 8,214,178 B2 | 7/2012 | Cone | |
| 8,483,857 B2 | 7/2013 | Orth | |
| 8,655,628 B2 | 2/2014 | Cone | |
| 9,939,806 B2 | 4/2018 | Leeson et al. | |
| 10,722,974 B2 | 7/2020 | Bakmazjian et al. | |
| 10,838,398 B2 | 11/2020 | Leeson et al. | |
| 10,856,957 B2 | 12/2020 | Hasan et al. | |
| 10,871,764 B2 | 12/2020 | Nordell et al. | |
| 10,882,303 B2 | 1/2021 | Fisker et al. | |
| 10,915,934 B2 | 2/2021 | Bishop et al. | |
| 11,654,005 B2 | 5/2023 | Hasan et al. | |
| 2006/0008774 A1 | 1/2006 | Orth et al. | |
| 2007/0048689 A1 | 3/2007 | Holzner et al. | |
| 2009/0319068 A1 | 12/2009 | Sager | |
| 2020/0000562 A1 | 1/2020 | Wey | |
| 2020/0179082 A1 | 6/2020 | Scheider et al. | |
| 2021/0255600 A1 | 8/2021 | Faust | |
| 2024/0033061 A1* | 2/2024 | Hultgren | A61C 13/0004 |

* cited by examiner

*Primary Examiner* — Michael J Brown
(74) *Attorney, Agent, or Firm* — Ann M. Knab; Thad McMurray

(57) ABSTRACT

A manufacturing method for a dental object, including the steps of generating (S101) a digital dental object in a coordinate system describing a shape of the dental object to be manufactured; rotating (S102) the spatial orientation of the digital dental object in the coordinate system based on a digital reference object in the coordinate system; and manufacturing (S103) the dental object based on the digital dental object with the rotated spatial orientation.

15 Claims, 3 Drawing Sheets

MANUFACTURING METHOD FOR A DENTAL OBJECT

CROSS-REFERENCE TO RELATED APPLICATIONS

Figure 1:
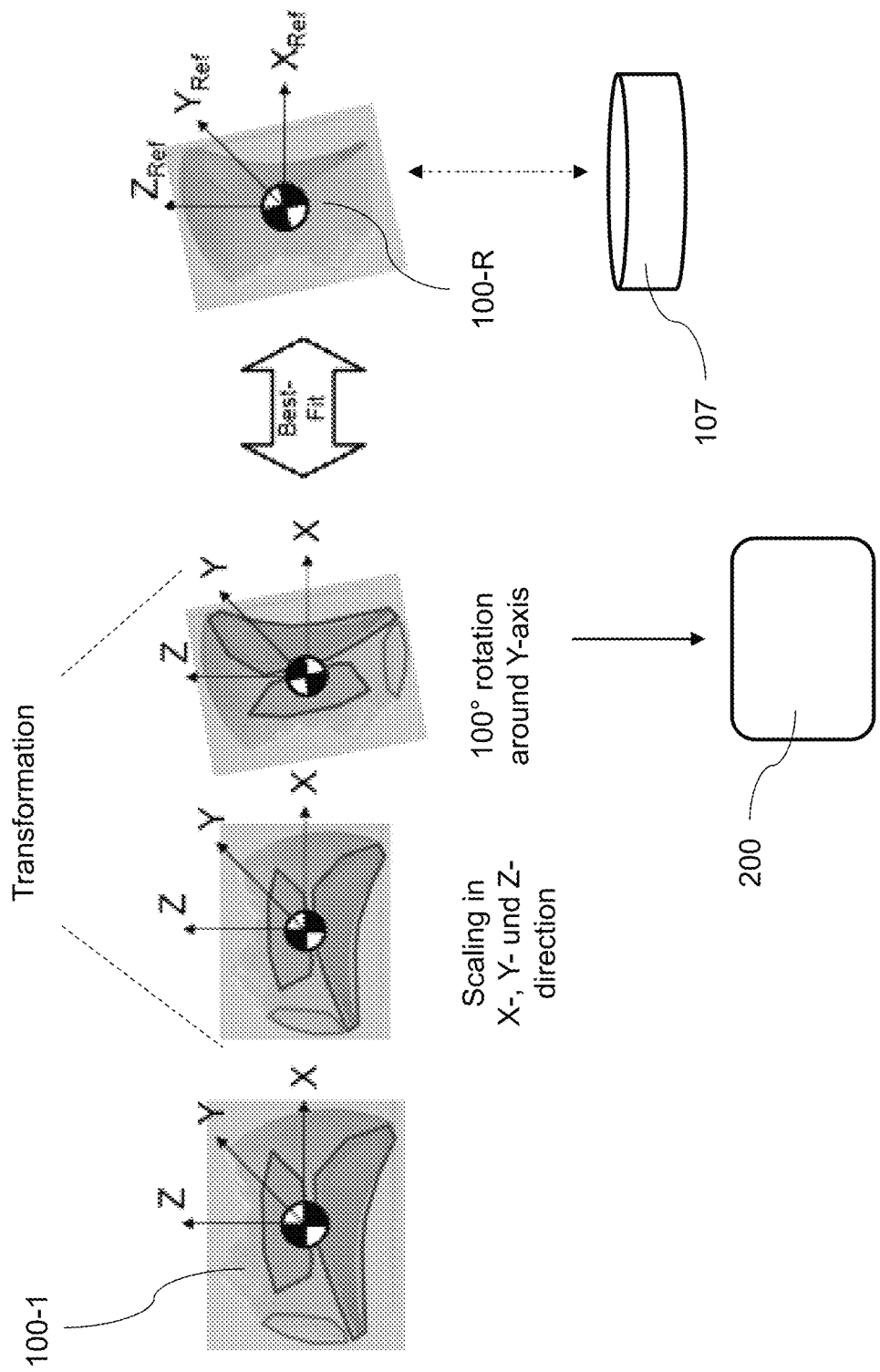

This application claims priority to European Patent Application No. 22165823.0 filed on Mar. 31, 2022, the disclosure of which is incorporated herein by reference in its entirety.

TECHNICAL FIELD

The present invention relates to a manufacturing method for a dental object and a manufacturing system for manufacturing a dental object.

BACKGROUND

In known digital workflows, dental restorations are generated in the CAD software and saved in a 3D CAD file format. Depending on the used CAD software and the subsequent workflow, so-called metadata can be generated and stored together with the 3D CAD file, comprising additional information. However, for the production of a dental object, an adjustment of an orientation may be necessary.

Metadata can be helpful to control or optimize the ablative manufacturing processes, such as assigning milling strategies for a specific restoration type. In three-dimensional printing processes where support structures are required, such as in stereolithography, VAT polymerization, 3D DLP printing, or selective laser sintering of metals, certain areas of dental restorations should be free from the connection of support structures in order to positively influence precision and surface quality.

In the case of metadata, however, there is the disadvantage that they are already generated in the CAD software beforehand and that they are in a proprietary data format. In this case, any CAM software used must be able to import and interpret the associated proprietary metadata. Since these metadata formats are not universal, a separate interface must be programmed for each proprietary metadata format. If no metadata are available for an object, the CAM software cannot determine which indication it is during import.

U.S. Pat. No. 10,856,957 B2 relates to a method of producing a three-dimensional digital model of a prosthetic base for fabrication using a light-based three-dimensional printing device, and is hereby incorporated by reference in its entirety. US 20210255600 is directed to a method of producing a dental restoration and is hereby incorporated by reference in its entirety.

US 20070048689, 20090319068, 20200000562, 20200179082, 20060008774, U.S. Pat. Nos. 10,838,398, 10,722,974, 9,939,806, 8,655,628, 8,483,857, 8,214,178, and 8,209,044, are directed to methods and materials for making dental restorations and are hereby incorporated by reference in their entirety. U.S. Pat. Nos. 10,915,934, 10,871,764, and 10,882,303, are directed to methods/machines using computers in carrying out various processes and are hereby incorporated by reference in their entirety.

SUMMARY

It is the technical object of the invention to orient a digital dental object in such a way that it can subsequently be efficiently produced in a manufacturing method.

This technical object is solved by subject-matter according to the independent claims. Technically advantageous embodiments are the subject of the dependent claims, the description and the drawings.

According to a first aspect, the technical problem is solved by a manufacturing method for a dental object, comprising the steps of generating a digital dental object in a coordinate system describing a shape of the dental object to be manufactured; rotating the spatial orientation of the digital dental object in the coordinate system based on a digital reference object in the coordinate system; and manufacturing the dental object based on the digital dental object with the rotated spatial orientation. The manufacturing method achieves an automatically optimized, manufacturing-specific orientation of dental indications for the digital manufacturing method.

In a technical advantageous embodiment of the manufacturing method, a size of the digital reference object is adapted to a size of the digital dental object and/or a size of the digital dental object is adapted to a size of the digital reference object. The sizes of the digital reference object and the digital dental object are adapted to each other by uniform scaling so that they are as similar as possible. This achieves, for example, the technical advantage that a higher match or overlap between the digital dental object and the digital reference object is achieved.

In a further technically advantageous embodiment of the manufacturing method, the orientation of the digital dental object in the coordinate system is rotated until a spatial deviation between the digital dental object and the digital reference object is below a predetermined value. The value of the deviation can be determined from a spatial overlap area of the two objects. This achieves the technical advantage, for example, that the digital dental object and the digital reference object can be approximated to each other in an iterative process.

In a further technically advantageous embodiment of the manufacturing method, a position of the digital dental object in the coordinate system is shifted on the basis of a digital reference object in the coordinate system. This also achieves, for example, the technical advantage that a higher match or overlap between the digital dental object and the digital reference object is achieved.

In a further technically advantageous embodiment of the manufacturing method, the position of the digital dental object in the coordinate system is shifted until a spatial deviation between the digital dental object and the digital reference object is below a predetermined value. This also achieves the technical advantage, for example, that the digital dental object and the digital reference object can be approximated to each other in an iterative process.

In a further technically advantageous embodiment of the manufacturing method, the dental object is produced by means of an additive manufacturing method. This achieves, for example, the technical advantage that the dental object can be produced in a simple manner in any desired shape.

In a further technically advantageous embodiment of the manufacturing method, a digital support structure is added to the digital dental object with the rotated spatial orientation based on the orientation of the reference object. The addition of the support structure can be performed independently of the reference object. This achieves, for example, the technical advantage that the digital support structure is automatically added at a provided and suitable location. This can improve and accelerate the production of the dental object. This achieves the additional technical advantage, for example, that the support structure can be automatically arranged on intended and suitable areas.

In a further technically advantageous embodiment of the manufacturing method, the dental object is manufactured by means of a subtractive manufacturing method. This also achieves, for example, the technical advantage that the dental object can be manufactured in a simple manner.

In a further technically advantageous embodiment of the manufacturing method, a digital holding structure is added to the digital dental object with the rotated spatial orientation based on the orientation of the reference object. This achieves, for example, the technical advantage that holding bars for holding a milled-out dental object are automatically arranged only at suitable locations on the dental object. This achieves, for example, the technical advantage that the holding structure can be automatically arranged on intended and suitable areas.

In a further technically advantageous embodiment of the manufacturing method, the digital reference object is retrievable from a database with several digital reference objects. A different reference object can be retrievable for different manufacturing methods, such as a 3D printing method, a press method, a casting method, or a post-tempering method. In this case, the manufacturing method is first selected and the reference object for the manufacturing method is retrieved from the database. This achieves, for example, the technical advantage that an optimal orientation of the dental object is achieved depending on the manufacturing method.

In a further technically advantageous embodiment of the manufacturing method, the digital dental object comprises data on an indication. This achieves the technical advantage, for example, that a suitable reference object can be selected depending on the indication.

In a further technically advantageous embodiment of the manufacturing method, the digital reference object is retrievable from a database based on the data about the indication or can be assigned. The digital reference object can also be selected or determined manually. This achieves the technical advantage, for example, that different reference objects for different indications can be retrieved and/or assigned to the digital dental object.

According to a second aspect, the technical problem is solved by a manufacturing system for manufacturing a dental object, comprising a computer program comprising instructions which, when the computer program is executed by a computer, cause the computer program to execute the method according to the first aspect. Thereby, the same technical advantages are achieved as by the method according to the first aspect.

It is preferable that the manufacturing system includes a computer program product having program code which is stored on a non-transitory machine-readable medium having computer instructions executable by a processor, which computer instructions cause the processor to perform the method discussed herein.

It is preferable that a computer program product is provided having program code which is stored on a non-transitory machine-readable medium having computer instructions executable by a processor, which computer instructions cause the processor to perform the method discussed herein.

BRIEF DESCRIPTION

Examples of embodiments of the invention are shown in the drawings and are described in more detail below.

Figure 2:
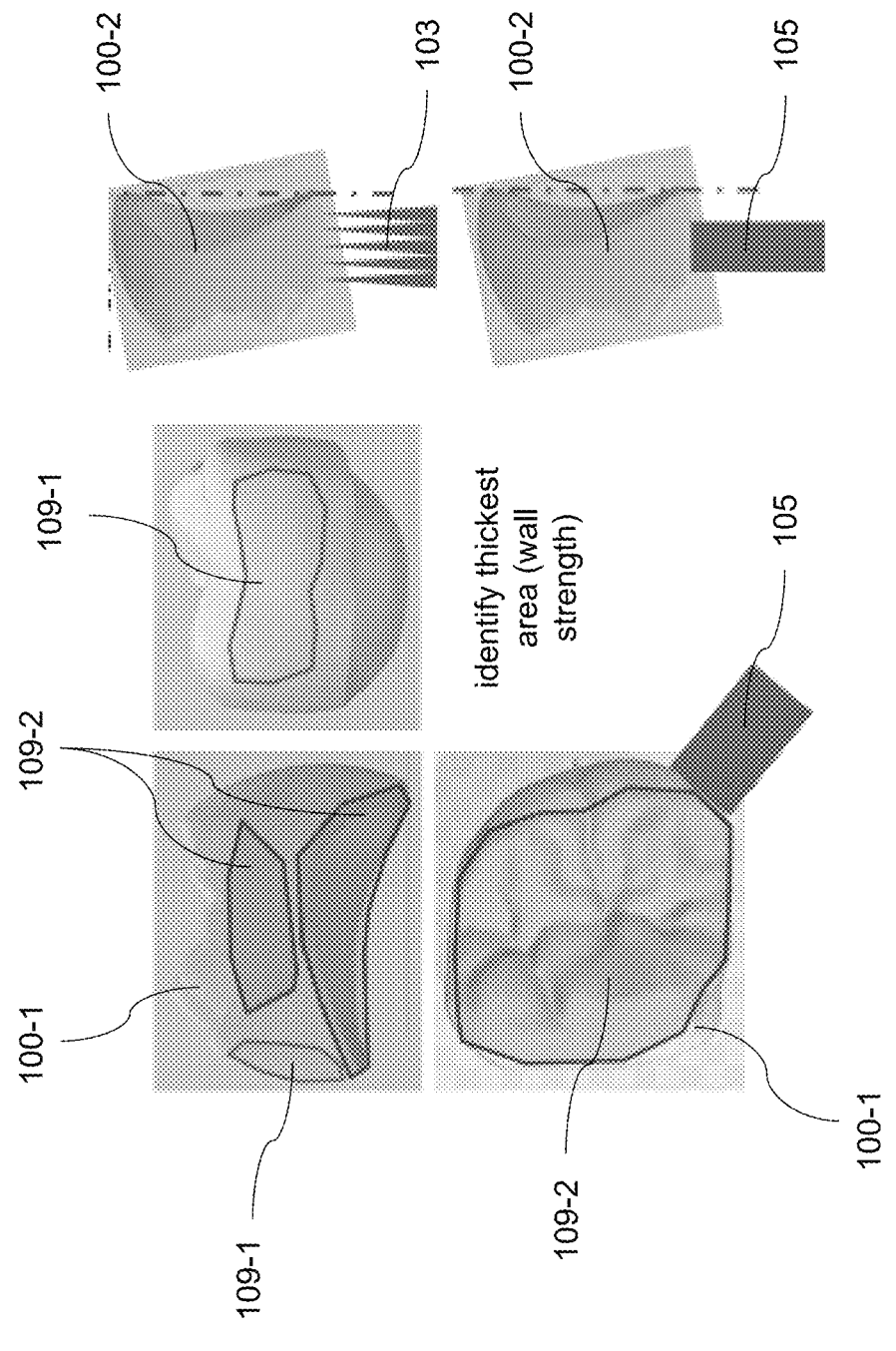

The figures show:

FIG. 1 a schematic view of the manufacturing method for a dental object;

FIG. 2 a dental object with support or holding structures; and

Figure 3:
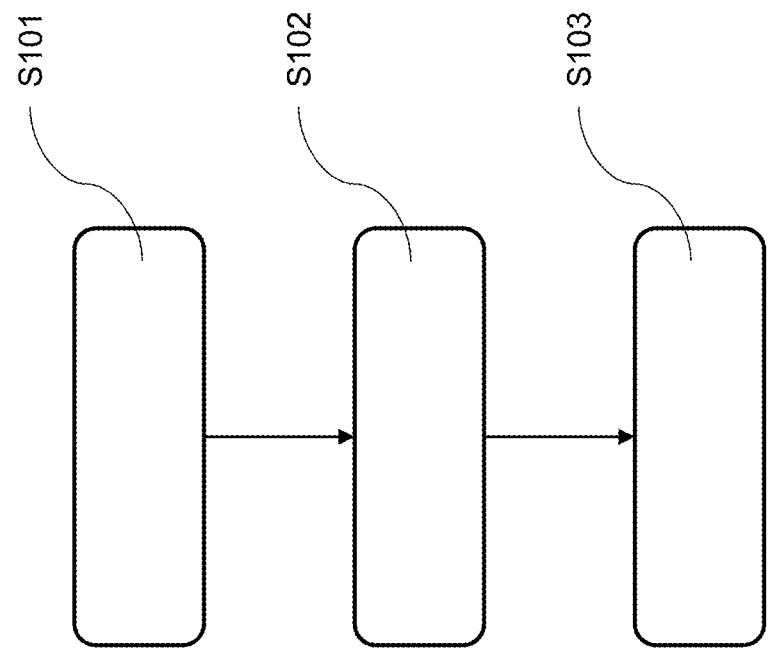

FIG. 3 a block diagram of a manufacturing method for a dental object.

DETAILED DESCRIPTION

FIG. 1 shows a schematic view of the manufacturing method for a real dental object 100-2 based on a digital dental object 100-1. The real dental object 100-2 is, for example, a crown, a bridge, a veneer, an abutment, an inlay, an onlay, a splint or a partial or full denture. In general, the dental object 100-2 can be any object in the dental field that is to be manufactured using a three-dimensional manufacturing method, such as a 3D printing method or milling method.

First, the CAD software generates a digital dental object 100-1 in a coordinate system that describes a shape of the dental object 100-2 to be manufactured. The digital dental object 100-1 is initially oriented in an arbitrary orientation in the coordinate system. The digital dental object 100-1 serves for a particular indication. For example, the shape of the digital dental object 100-1 is indicated by a set of triangles or coordinates that define the surface of the digital dental object 100-1. The digital dental object 100-1 may be stored in a data set.

A database 107 includes a plurality of digital reference objects 100-R, each of which is associated with, for example, an indication and a manufacturing method.

The reference object 100-R specifies a reference shape with a specific reference position and orientation within the coordinate system. For example, the shape of the digital dental object 100-R is also indicated by a set of triangles or coordinates that define the surface of the reference object 100-R. The digital reference object 100-R may also be stored in a data set.

In addition to the indication, the following information can be stored in the database 107 for the reference object 100-R:

Description of the orientation of the 100-R reference object by dental technical terms;

Which areas 109-1 may be provided with support or holding structures 103 or 105 (support requirement); and Which areas 109-2 may not be provided with by support or holding structures 103 or 105 (support prohibition).

The areas 109-1 and 109-2 describing provisions and prohibitions for a support or holding structure on the reference object 100-R can be transferred to the digital dental object 100-1.

A digital reference object 100-R of an indication corresponding to the indication of the digital dental object 100-1 is loaded from the database 107. If the indication of the digital dental object 100-1 is, for example, an inlay, the digital reference object 100-R for an inlay is loaded from the database 107, for example.

When both the digital dental object 100-1 and the reference object 100-R are loaded, the digital dental object 100-1 is scaled to a similar size to the reference object 100-R or vice versa. Alternatively, the dental object 100-1 and the reference object 100-R can be scaled to a common similar size. The aspect ratio should not change in the process. Then, different rotation or translation operations are performed on the digital dental object 100-1, such as rotating the digital dental object 100-1 about a Y-axis. In a displacement operation, the centers of mass of the digital dental object 100-1 and the reference object 100-R may be superimposed. The scaling as well as the rotation and shifting serve the purpose of achieving a maximum overlap between the digital dental object 100-1 and the reference object 100-R.

An overlap can be calculated by adjusting the Jaccard coefficient of the digital dental object 100-1 and the reference object 100-R. To calculate the overlap, the spatial intersection between the digital dental object 100-1 and the reference object 100-R can be calculated.

The scaling and the rotation or displacement operations can be iteratively repeated for this purpose until a spatial deviation between the digital dental object 100-1 and the digital reference object 100-R is below a predetermined value. The deviation may be calculated as an overlapping ratio based on a volume. The degree of overlapping can be a ratio-scaled number between 0 and 1, which can be regarded as a percentage.

For the calculation, the digital dental object 100-1 and the reference object 100-R are transformed into a voxel representation. Subsequently, all empty voxels within both objects are filled. The number of voxels occupied by both objects is divided by the number of total filled voxels. This corresponds to a calculation of the Jaccard coefficient of two sets, also known as intersection over union (IoU). The calculated value between 0 and 1 indicates how far the two three-dimensional objects coincide. This value can be maximized by translation and rotation of the objects.

Superimposition and iterative matching are performed according to the best-fit method. The digital dental object 100-1 is scaled and rotationally and translationally transformed until a maximum overlap with the reference object 100-R is achieved. In this way, it is possible to determine an orientation and position of the digital dental object 100-1 that is matched to the orientation and position of the reference object 100-R in the coordinate system.

The digital dental object 100-1 transformed in this way is saved in the coordinate system of the reference object 100-R. The digital dental object 100-1 is then stored in this new orientation and position in the coordinate system and made available accordingly for the subsequent processing steps in the CAM software for production preparation. After the production-specific data preparation, the real dental object 100-2 is then produced.

For example, the manufacturing system 200 is a 3D printer. In general, the manufacturing system 200 is any system suitable for manufacturing the dental object. For example, the manufacturing system 200 comprises a computer having a digital memory and a processor for executing a computer program by which individual steps of the manufacturing method are implemented.

The coordinate system of the reference object 100-R is ideally identical to the coordinate system for the manufacturing system 200, such as the coordinate system of a build space of a 3D printer. In 3D DLP printing, a stereolithography method as a manufacturing method, the dental object 100-2 is built up layer by layer from bottom to top (bottom up).

Here, the common coordinate system with the X and Y axes spans the build platform and the Z axis points away from the build platform. In this coordinate system, the aligned digital dental object 100-1 is provided in the CAM software for further build job preparation. Provisioning includes, but is not limited to, data repair, creation of support or holding structures 103 or 105, nesting, and/or slicing.

Overall, the automatic and production-specific orientation of the digital dental object 100-1 is performed by superimposing, matching, comparing and transforming the digital dental object 100-1 with the reference object 100-R of a suitable indication. The selection or determination of the dental indication can also be performed manually.

The optimized alignment of the digital dental object 100-1 based on the reference object 100-R enables the dental object 100-1 to be manufactured as quickly as possible, the provisions and prohibitions for holding or supporting structures to be observed as best as possible, it requires as few holding or supporting structures 103 or 105 as possible, and indication-relevant surfaces of the dental object 100-2 do not have to be reworked.

Through the CAM software, dental knowledge can be implemented to optimal digital manufacturing methods. The CAM software provides for an optimal orientation of the dental objects 100-1 for the respective manufacturing method, such as an additive or subtractive manufacturing method. A manufacturing time, a result quality for a fit and surface quality and a minimum effort in reworking for the user can be considered.

These results may in turn be fed back into the database 107, such as a look-up table, so that a new three-dimensional reference object 100-R is stored in the coordinate system by those skilled in the art in an optimal position and orientation for the manufacturing method.

FIG. 2 shows a dental object 100-1 with support or holding structures 103 and 105. The dental workflow can be further improved by the CAM software by also defining rules for generating support or holding structures 103 or 105 for the dental object 100-1. These support structures or holding structures 103 or 105 can be dependent on an indication, i.e. be indication-specific. If the indication of the imported dental object 100-1 is known to the CAD or CAM software, optimizing measures can be performed with a corresponding data set in the further workflow. The reference object 100-R of a specific indication is already oriented and positioned in such a way that it considers or optimally supports the dental work process and the provisions and prohibitions for holding or supporting structures 103 or 105 are obeyed as well as possible. For example, a crown is oriented so that the occlusal surface and cavity face the side and the thickest wall thickness faces the build platform. In this case, the occlusal surface and cavity are among the prohibited areas and the outer surface with the thickest wall thickness is among the allowed surface for creating the support structure(s).

The support structures 103 support the fabricated dental object 100-2 against the build platform during 3D printing to ensure successful printing. The support structures 105 hold the manufactured dental object 100-2 in position within a blank during and after a milling method.

For example, areas 109-1 can be provided in the reference object 100-R which are to be provided with support or holding structures 103 or 105 (support or holding structure requirement) or areas 109-2 can be provided which must not be provided with support or holding structures 103 or 105 (support or holding structure prohibition). Due to the dental technical expertise and the knowledge of the respective manufacturing method (subtractive or additive), the reference object 100-R is oriented and positioned accordingly in such a way that it considers the provisions and prohibitions for support or holding structures 103 or 105 as far as possible. Due to the adapted, automatic orientation of the digital dental object 100-1 according to the specification of the reference object 100-R, these provisions and prohibitions are also indirectly considered in the digital dental object 100-1 by the new orientation.

Thus, the dental object 100-1 results in similar support or holding structures 103 or 105 that are specific to the indication and fabrication. The parameters to be used for the support or holding structures 103 and 105 may also be stored in the reference object 100-R, such as a feature (thickness, contact area) and/or density/number of the support or holding structures 103 and 105.

CAM software can then automatically generate the required support or holding structures 103 or 105 according to its rules/algorithms based on the specified parameters, so that the build job can be manufactured as quickly and stably as possible with as few support or holding structures 103 or 105 as possible.

FIG. 3 shows a block diagram of a manufacturing method for a dental object 100-2. The manufacturing method comprises the step S101 of generating a digital dental object 100-1 in a coordinate system describing a shape of the dental object 100-2 to be manufactured. For example, the digital dental object 100-1 may be generated in a computer aided design (CAD) process. In this CAD process, the shape and appearance of the digital dental object 100-1 are determined. The digital dental object 100-1 forms the basis for manufacturing a real dental object 100-1.

In 3D modeling, the digital dental object 100-1 is built up and saved in a three-dimensional form. In this way, a realistic representation can be achieved. The digital dental object 100-1 can be saved and transferred as a data set, for example as a file in STL format.

In step S102, the spatial orientation of the digital dental object 100-1 in the coordinate system is reoriented and/or repositioned based on a digital reference object 100-R in the coordinate system. For this purpose, for example, the digital reference object 100-R, which has a defined orientation in the coordinate system, is loaded into a memory together with the digital dental object 100-1. The digital dental object 100-1 and the reference object 100-R are first brought to a similar size by uniform scaling. Then, for example, the orientation of the digital dental object 100-R in the coordinate system is rotated or the position of the digital dental object 100-1 in the coordinate system is shifted until a spatial deviation between the digital dental object 100-1 and the digital reference object 100-R becomes minimal or is below a predetermined value.

In step S103, the real dental object 100-2 is manufactured based on the digital dental object 100-1 with the rotated spatial orientation using a suitable manufacturing method.

The digital dental object 100-1 can, for example, be oriented in a blank, such as in milling, or in a build space, such as in 3D printing, depending on the indication and a selected manufacturing method. The orientation is done in such a way that critical surfaces for the form and function of the real dental object are not distorted by the holding or support structures 103 or 105 automatically generated in the CAM software, a stable manufacturing method is guaranteed and reworking for the dental technician or dentist is minimized.

The assignment of an indication to the digital dental object 100-1 may already be done automatically by the CAD software and may be included in the file name, for example, or may have been subsequently identified by the user in the CAM software and assigned to the digital dental object 100-1.

All features explained and shown in connection with individual embodiments of the invention may be provided in different combinations in the subject-matter of the invention to simultaneously realize their beneficial effects.

All method steps can be implemented by means which are suitable for executing the respective method step. All functions that are executed by the objective features can be a method step of a method.

In some embodiments, the innovations may be implemented in diverse general-purpose or special-purpose computing systems. For example, the computing environment can be any of a variety of computing devices (e.g., desktop computer, laptop computer, server computer, tablet computer, gaming system, mobile device, programmable automation controller, etc.) that can be incorporated into a computing system comprising one or more computing devices.

In some embodiments, the computing environment includes one or more processing units and memory. The processing unit(s) execute computer-executable instructions. A processing unit can be a central processing unit (CPU), a processor in an application-specific integrated circuit (ASIC), or any other type of processor. In a multi-processing system, multiple processing units execute computer-executable instructions to increase processing power. A tangible memory may be volatile memory (e.g., registers, cache, RAM), non-volatile memory (e.g., ROM, EEPROM, flash memory, etc.), or some combination of the two, accessible by the processing unit(s). The memory stores software implementing one or more innovations described herein, in the form of computer-executable instructions suitable for execution by the processing unit(s).

A computing system may have additional features. For example, in some embodiments, the computing environment includes storage, one or more input devices, one or more output devices, and one or more communication connections. An interconnection mechanism such as a bus, controller, or network, interconnects the components of the computing environment. Typically, operating system software provides an operating environment for other software executing in the computing environment, and coordinates activities of the components of the computing environment.

The tangible storage may be removable or non-removable, and includes magnetic or optical media such as magnetic disks, magnetic tapes or cassettes, CD-ROMs, DVDs, or any other medium that can be used to store information in a non-transitory way and can be accessed within the computing environment. The storage stores instructions for the software implementing one or more innovations described herein.

The input device(s) may be, for example: a touch input device, such as a keyboard, mouse, pen, or trackball; a voice input device; a scanning device; any of various sensors; another device that provides input to the computing environment; or combinations thereof. The output device may be a display, printer, speaker, CD-writer, or another device that provides output from the computing environment.

The scope of protection of the present invention is given by the claims and is not limited by the features explained in the description or shown in the figures.

REFERENCE LIST

100-1 Digital dental object
100-2 Real dental object
100-R Digital reference object
103 Support structure
105 Holding structure
107 Database 109-1 Provision area for support or holding structure
109-2 Prohibited area for support or holding structure
200 Manufacturing system

The invention claimed is:

1. A manufacturing method for a dental object (100-2), comprising the steps:
generating (S101) a digital dental object (100-1) in a coordinate system that describes a shape of the dental object (100-2) to be manufactured;
rotating (S102) the spatial orientation of the digital dental object (100-1) in the coordinate system based on a digital reference object (100-R) in the coordinate system; and
manufacturing (S103) the dental object (100-2) based on the digital dental object (100-1) with the rotated spatial orientation;
wherein a digital support structure (103) is added to the digital dental object (100-1) with the rotated spatial orientation based on the orientation of the reference object (100-R).

2. The manufacturing method according to claim 1, wherein a size of the digital reference object (100-R) is adapted to a size of the digital dental object (100-1) and/or a size of the digital dental object (100-1) is adapted to a size of the digital reference object (100-R).

3. The manufacturing method according to claim 1, wherein the orientation of the digital dental object (100-R) in the coordinate system is rotated until a spatial deviation between the digital dental object (100-1) and the digital reference object (100-R) is below a predetermined value.

4. The manufacturing method according to claim 1, wherein a position of the digital dental object (100-1) in the coordinate system is shifted based on a digital reference object (100-R) in the coordinate system.

5. The manufacturing method according to claim 1, wherein the position of the digital dental object (100-1) in the coordinate system is shifted until a spatial deviation between the digital dental object (100-1) and the digital reference object (100-R) is below a predetermined value.

6. The manufacturing method according to claim 1, wherein the dental object (100-2) is manufactured by an additive manufacturing method.

7. The manufacturing method according to claim 1, wherein the reference object (100-R) specifies which areas can be provided with a support structure (103).

8. The manufacturing method according to claim 1, wherein the dental object (100-2) is manufactured by means of a subtractive manufacturing method.

9. The manufacturing method according to claim 8, wherein a digital holding structure (105) is added to the digital dental object (100-1) with the rotated spatial orientation based on the orientation of the reference object (100-R).

10. The manufacturing method according to claim 9, wherein the reference object (100-R) is specified in which areas can be provided with a holding structure (105).

11. The manufacturing method according to claim 1, wherein the digital reference object (100-R) is retrievable from a database (107) comprising a plurality of digital reference objects (100-R).

12. The manufacturing method according to claim 1, wherein the digital dental object (100-1) comprises data about an indication of the dental object.

13. The manufacturing method according to claim 12, wherein the digital reference object (100-1) is retrievable or assignable from a database (107) based on the data about the indication of the dental object.

14. A manufacturing system (200) for manufacturing a dental object comprising
a computer program product comprising program code which is stored on a non-transitory machine-readable medium comprising computer instructions executable by a processor, which computer instructions cause the processor to perform the method according to claim 1.

15. A computer program product comprising
program code which is stored on a non-transitory machine-readable medium comprising computer instructions executable by a processor, which computer instructions cause the processor to perform the method according to claim 1.

* * * * *